Nov. 21, 1950  C. J. DELEGARD ET AL  2,531,375
MANUFACTURE OF FRAMED PANELS
Original Filed June 9, 1947  9 Sheets-Sheet 1

INVENTORS.
CARL J. DELEGARD
MICHAEL J. NARDULLI
BY Ferd Bing
ATTORNEY

Nov. 21, 1950     C. J. DELEGARD ET AL     2,531,375
MANUFACTURE OF FRAMED PANELS
Original Filed June 9, 1947     9 Sheets-Sheet 2
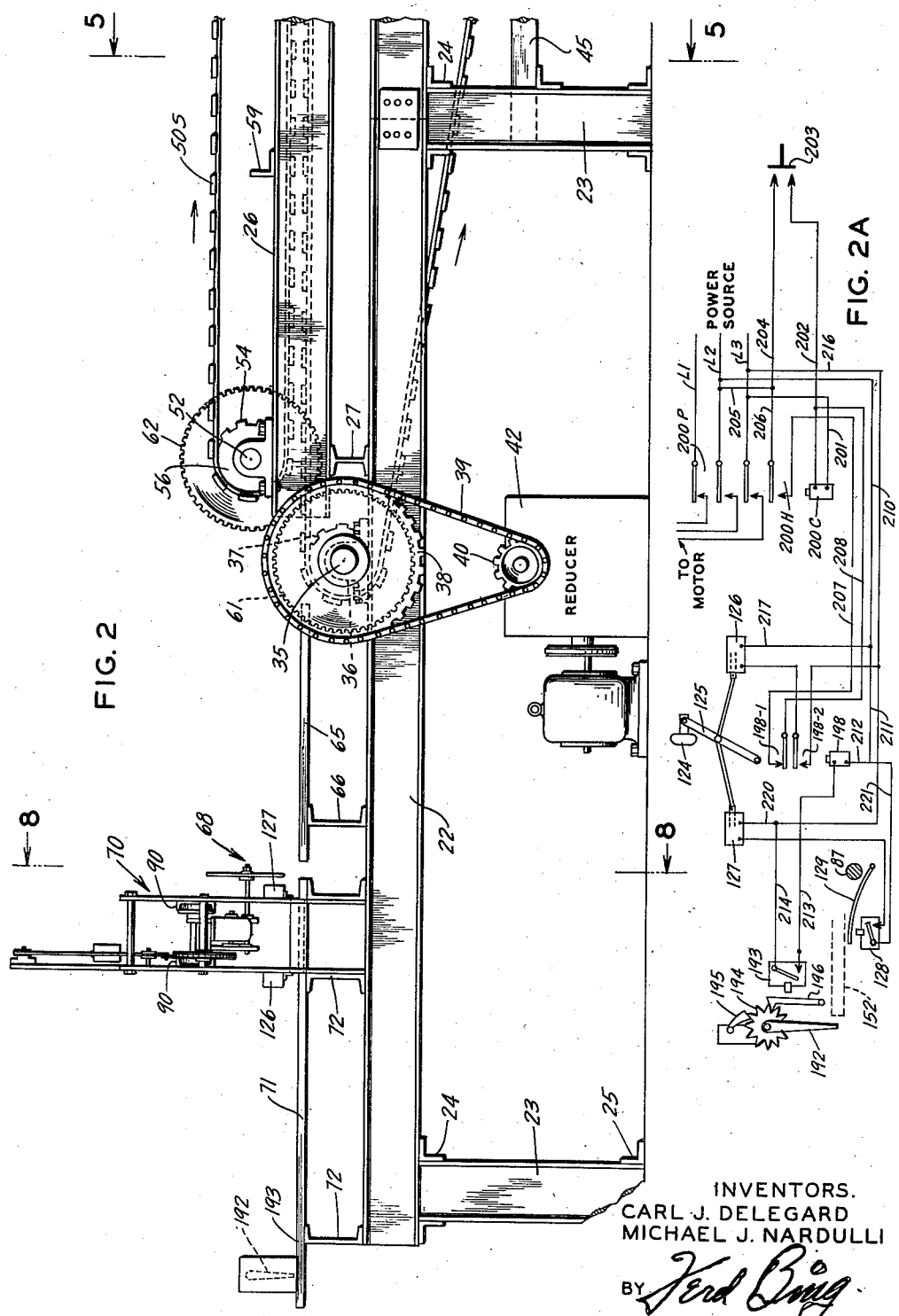
INVENTORS.
CARL J. DELEGARD
MICHAEL J. NARDULLI
BY
ATTORNEY

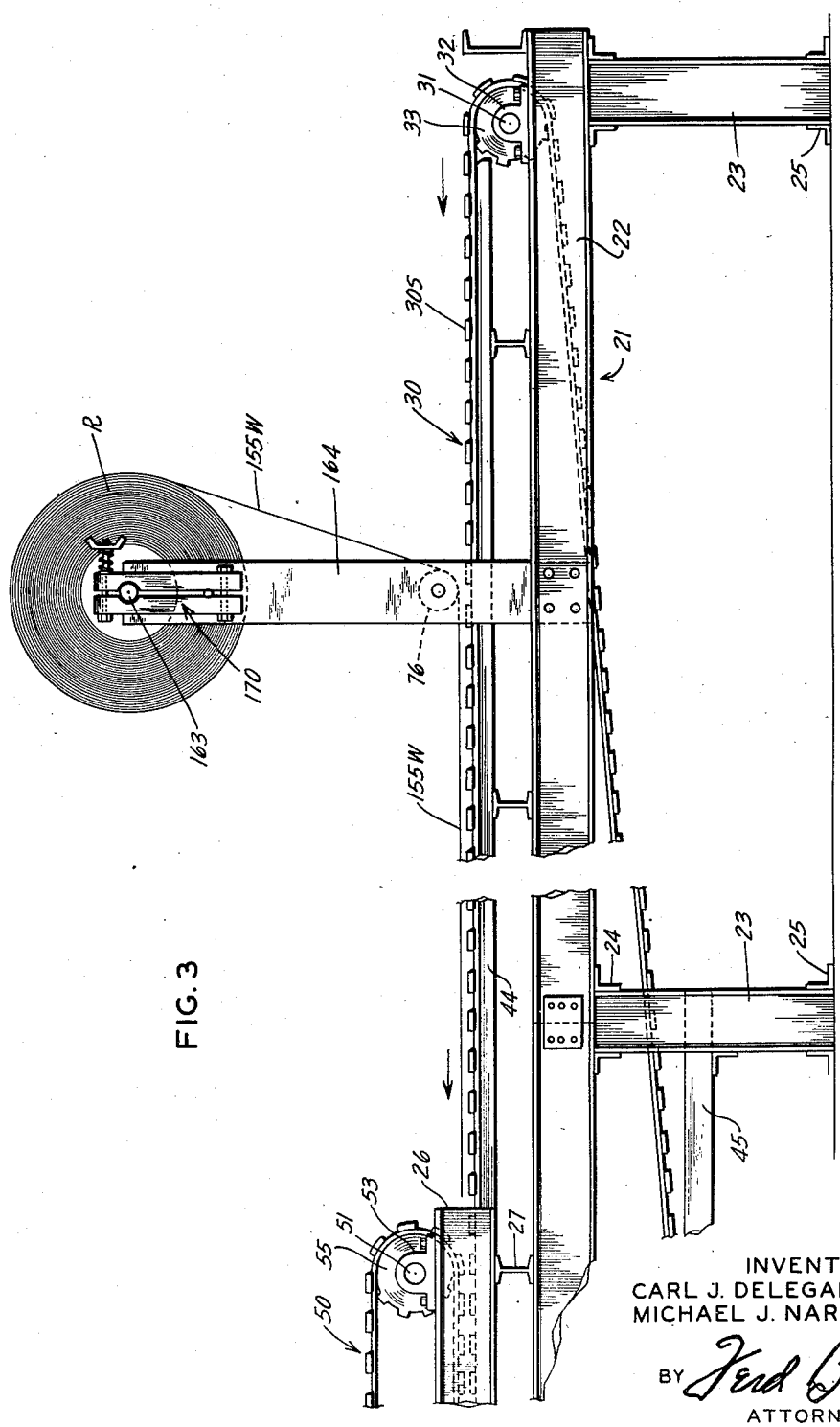

Nov. 21, 1950     C. J. DELEGARD ET AL     2,531,375
MANUFACTURE OF FRAMED PANELS
Original Filed June 9, 1947     9 Sheets-Sheet 4
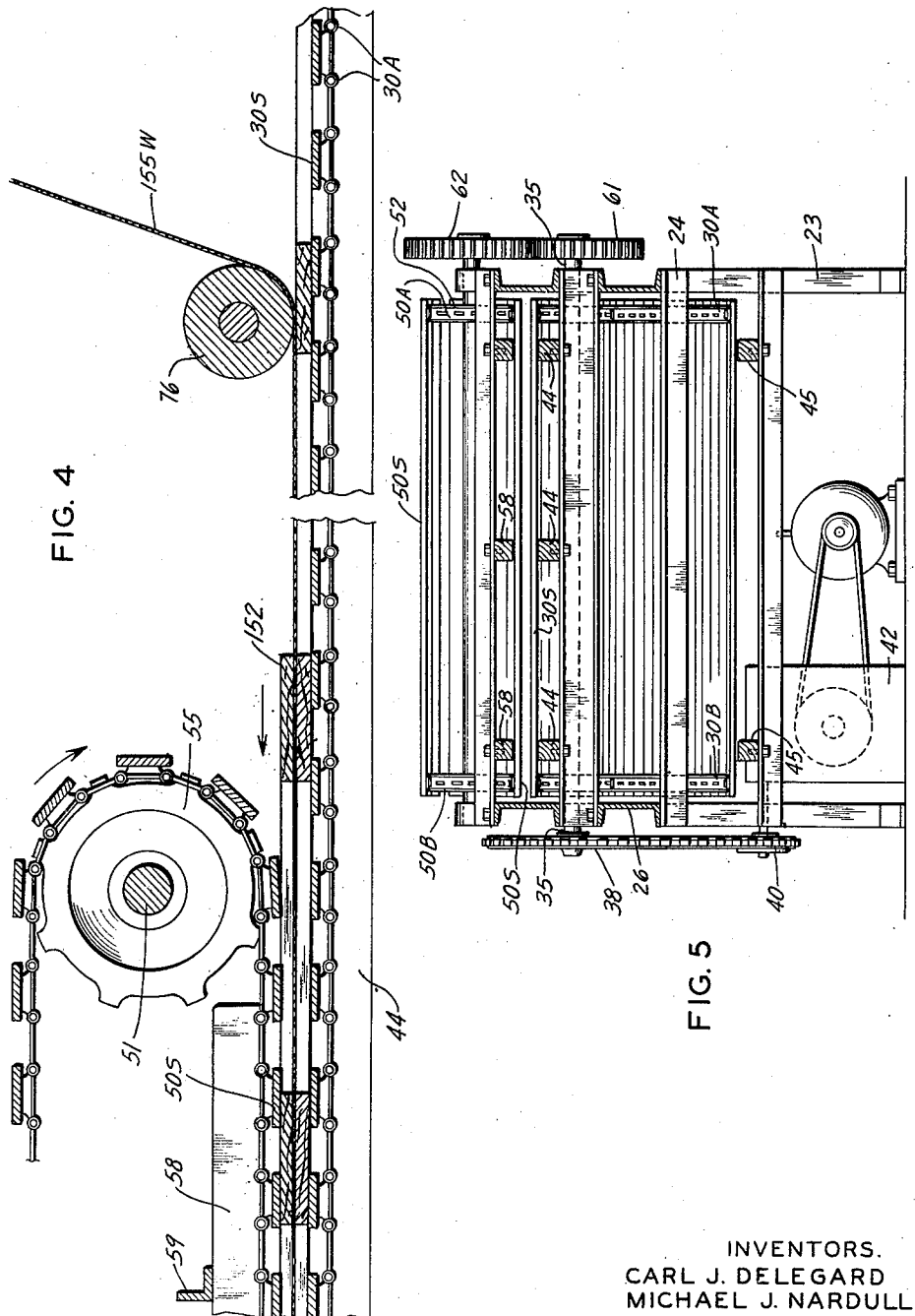
INVENTORS.
CARL J. DELEGARD
MICHAEL J. NARDULLI
BY *Ferd Bing*
ATTORNEY Nov. 21, 1950     C. J. DELEGARD ET AL     2,531,375
MANUFACTURE OF FRAMED PANELS
Original Filed June 9, 1947     9 Sheets-Sheet 5
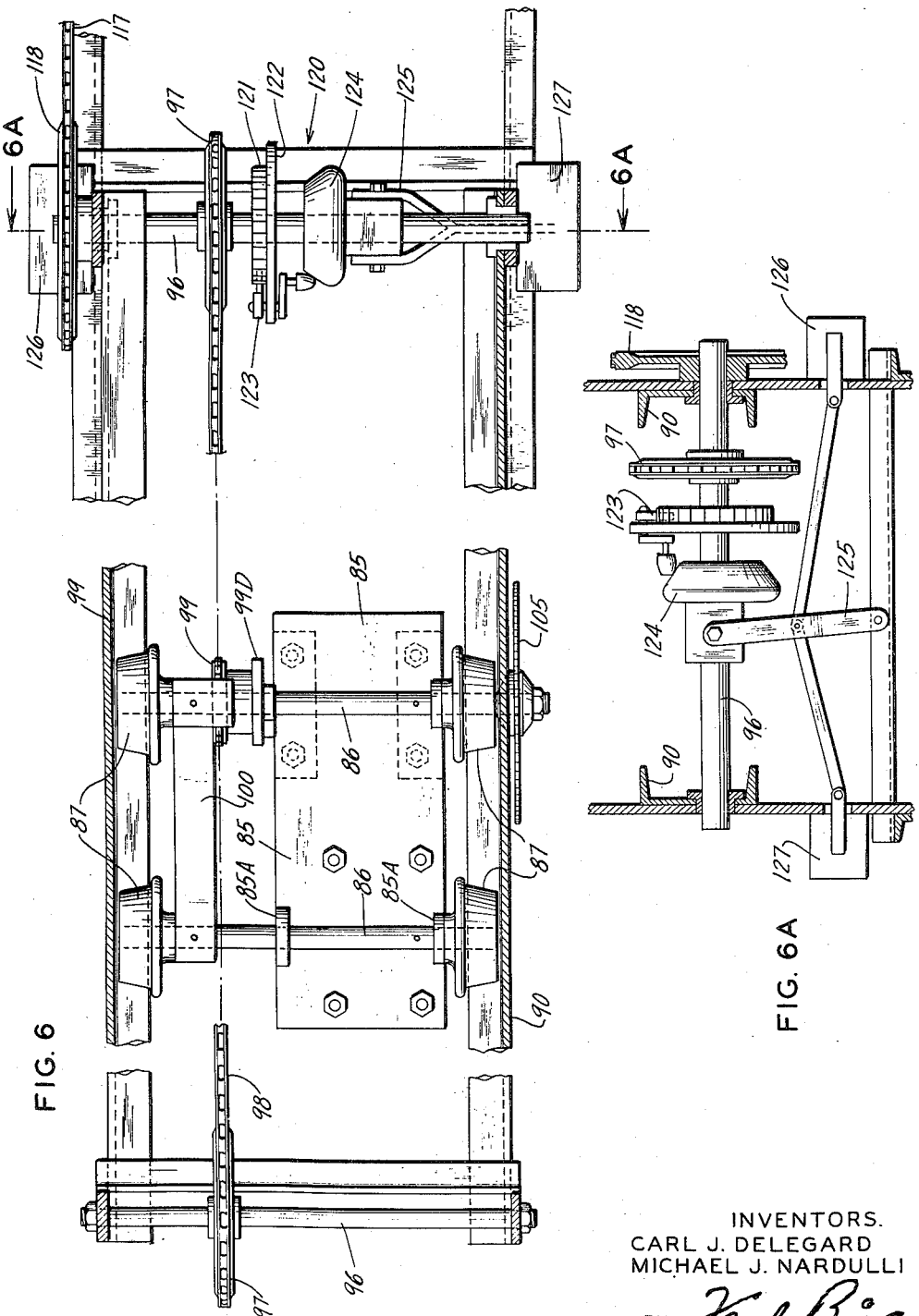
INVENTORS.
CARL J. DELEGARD
MICHAEL J. NARDULLI
BY Ferd Bing
ATTORNEY

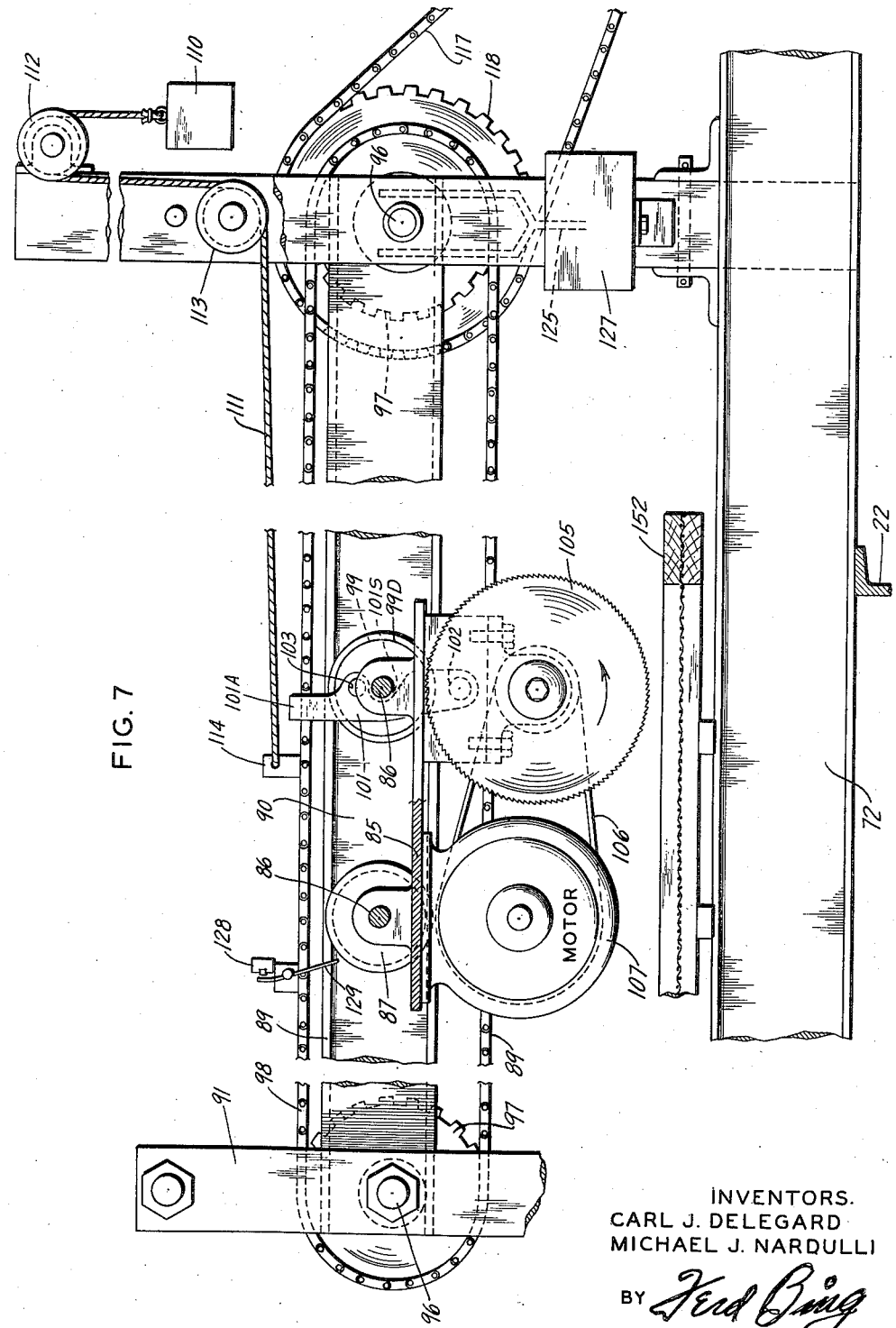

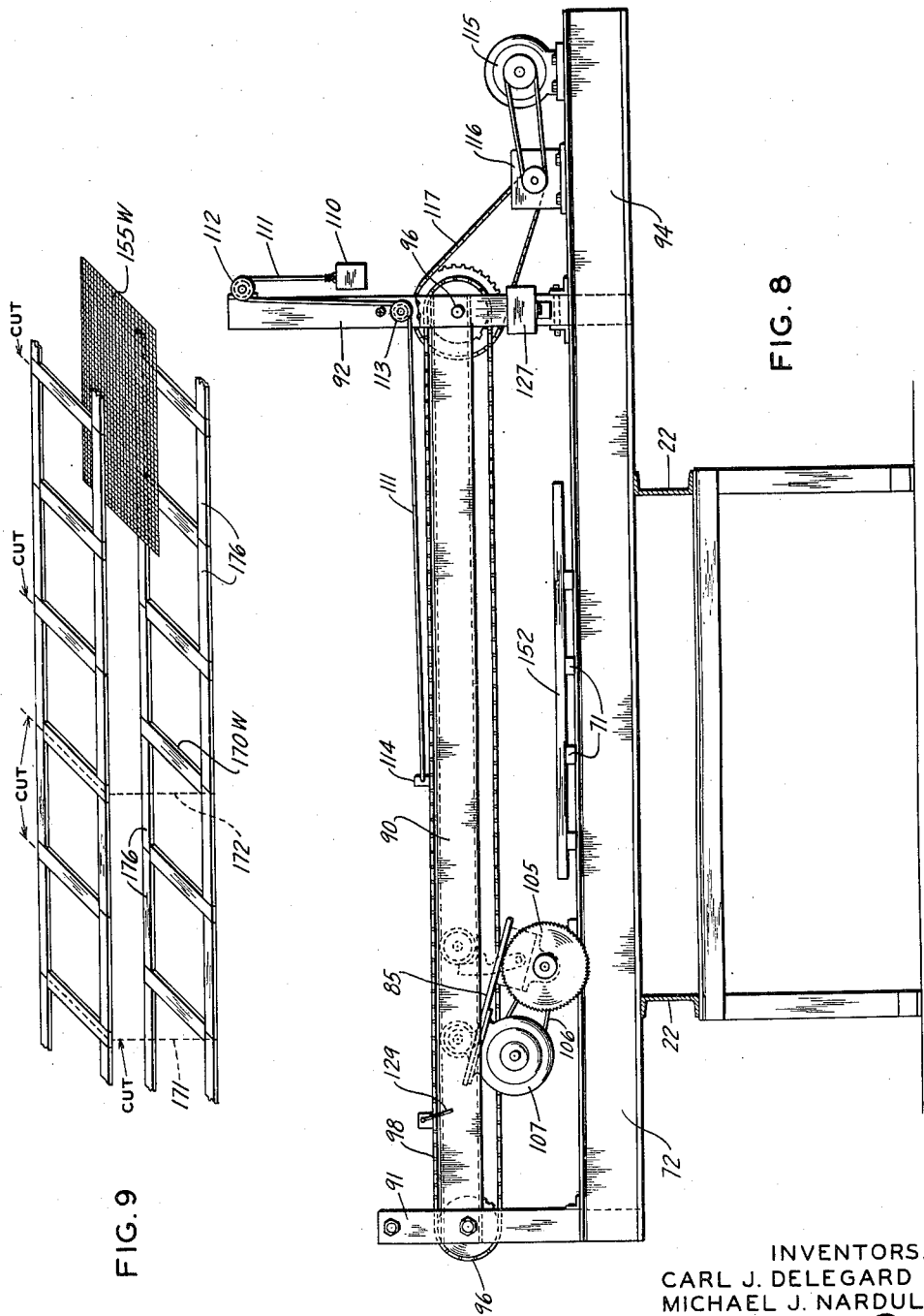

Nov. 21, 1950  C. J. DELEGARD ET AL  2,531,375
MANUFACTURE OF FRAMED PANELS
Original Filed June 9, 1947   9 Sheets-Sheet 8
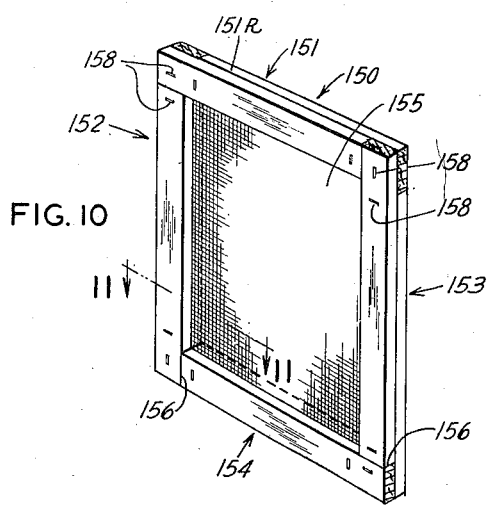
FIG. 10
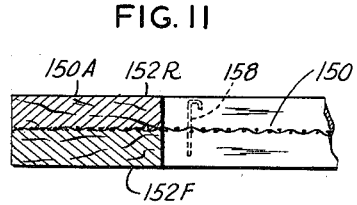
FIG. 11
FIG. 10A
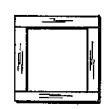
FIG. 10B
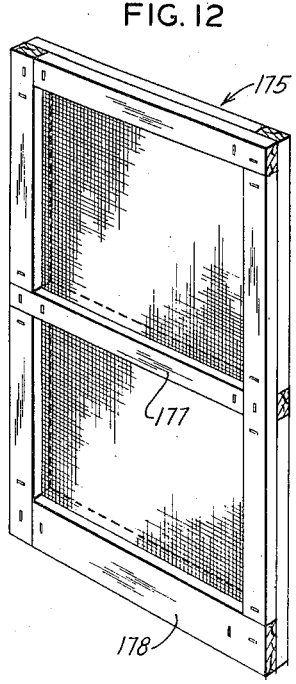
FIG. 12
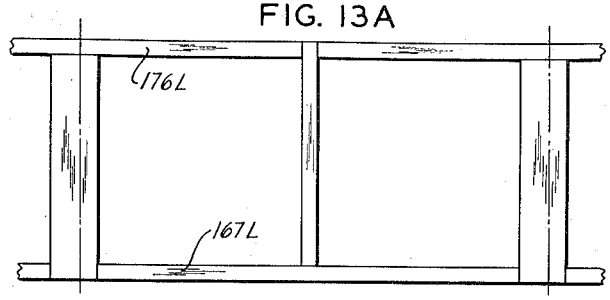
FIG. 13A
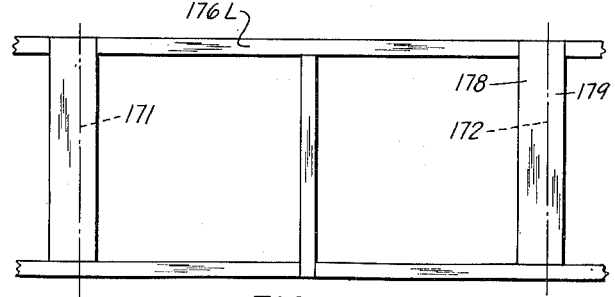
FIG. 13B
INVENTORS.
CARL J. DELEGARD
MICHAEL J. NARDULLI
ATTORNEY Nov. 21, 1950     C. J. DELEGARD ET AL     2,531,375
MANUFACTURE OF FRAMED PANELS Original Filed June 9, 1947                 9 Sheets-Sheet 9

INVENTORS.
CARL J. DELEGARD
MICHAEL J. NARDULLI
BY Ferd Bing
ATTORNEY

Patented Nov. 21, 1950

2,531,375

UNITED STATES PATENT OFFICE 2,531,375

MANUFACTURE OF FRAMED PANELS

Carl J. Delegard, Chicago, and Michael J. Nardulli, Elmwood Park, Ill., assignors to Michael J. Nardulli, Angelo F. Naples, Peter F. Nardulli, and William H. Mozal, as trustees, under a trust known as Western Engineering Trust Original application June 9, 1947, Serial No. 753,586. Divided and this application January 11, 1949, Serial No. 70,243

11 Claims. (Cl. 154—118)

This invention relates generally to the manufacture of framed panels, and particularly it relates to the manufacture of framed panels wherein a rectangular frame composed of side and end frame members is arranged to support and impart rigidity to a panel of relatively low strength material that extends across the frame that is thus defined.

Framed panels of the character with which the present invention is concerned are utilized in a wide variety of arts, and such framed panels may take the form of window sash, window screens, doors having panels of screen, glass, wood or other materials, or as elements of furniture such for example as the top of a card table or the like. Framed panels of the aforesaid general character have heretofore been made through the use of miter joints, dovetail joints or the like, between the four elements of the rectangular frame, and after formation of the frame it has in most instances been customary to mount the panel material on the frame by attaching the panel material either to the face of the frame members or by securing such panel material in rabbeted grooves about the inner edges of the frame. Such manufacture of framed panels involves a considerable amount of special machine work as well as hand work and fitting, and where the panel material is flexible in character as is the case when a screen material is employed, the problem of stretching and properly disposing the panel material on the frame is quite troublesome and it is quite common to find that the material has not been properly and neatly applied.

In view of the foregoing it is an important object of the present invention to enable framed panels of the aforesaid character to be more easily assembled, and an object related to the foregoing is to eliminate skilled forming and fitting operations in the production of such framed panels.

Another object is to enable framed panels of the aforesaid character to be rapidly produced through the use of an assembling machine whereby the parts of the framed panel need merely to be placed in a loosely held assembled relationship and are thereafter secured firmly and rigidly together by automatic operation of the machine.

The problem of stretching a screen panel material or a like flexible material such as transparent treated cloth or the like is recognized as being one of the reasons why framed panels of such a character are relatively expensive, and a further and important object of the present invention is to simplify the stretching and attachment of such flexible panel materials in the manufacture of framed panels. An object related to the foregoing is to enable such framed panels to be formed or assembled in a continuous succession so that the flexible panel material extends during the assembly and manufacturing operation between the successive framed panels, and through such an arrangement to afford a continuously stretched and properly formed body of panel material with respect to which the frame elements may be readily and easily assembled. An object related to the foregoing is to enable finish molding heretofore required in screen panels to be eliminated, thereby to save in material, assembly, labor and painting, with the resultant saving in cost of such screens; and further, to enable the formation and finishing of the wood elements to be simplified by enabling frame elements finished or smoothly surfaced by planing upon but two faces to be employed.

In accordance with prior practice, wood framed screens of standard design have been made from lumber that is 1⅛ inches by ¾ inch in cross section, and this has been considered to be necessary in order to attain sufficient strength in the corner joints of the screens. It is, of course, recognized that any reduction in the size or cross section of the lumber used in such frames would result in economy, either by savings in lumber, or by enabling lumber to be used which would otherwise be considered as scrap, and it is a further object of the present invention to enable this to be accomplished while at the same time enabling high strength screens, or other framed panels, to be readily and economically produced. A further and related object is to form each frame member from two half-thickness frame elements so as to facilitate use of thin strips such as barking strips, edgings, off falls and other material that would otherwise be considered as scrap, and by such a construction to minimize the objectionable effect of structural weaknesses that are often found in a particular frame element; and a related object is to enable at least a substantial proportion of such frame elements to be made from shorter pieces than heretofore were required, thereby to further promote the use of cheap scrap material.

In screen panels as heretofore constructed, and to some extent in other types of framed panels, the attainment of strength in the framed panels has been limited primarily to the frames, and it is a further object of the present invention to enable the relatively flexible or low strength panel material to cooperate efficiently with the frame elements to attain exceptionally high strength and extreme ruggedness and rigidity in the finished panels; and an object related to the foregoing is, through the greatly improved strength characteristics as aforesaid, to enable reduction in size and cost of the frame elements to be attained where the maximum of economy is desired. A further and related object is to afford a continuous bond or connection between the border edges of the panel and the frame elements, thereby to insure efficient force transmission and maximum bracing and strength in such structures.

Another important object of the present invention is to form the framed panels as a continuous and connected succession of such framed panels, and to thereafter separate the panels into the individual units in which they are to be finally used or sold.

As hereinbefore pointed out, the manufacture of framed panels as heretofore practiced has involved the special forming of the ends of each of the frame elements so as to prepare the same for cooperation in some type of flash joint, and such special forming operations are of course relatively expensive. It is therefore a further object of the present invention to enable framed panels having efficient and rigid corner joints to be produced from frame elements having rectangularly formed ends, thereby to simplify the preparation of such frame elements.

Other and further objects of the present invention will be apparent from the following description and claims and are illustrated in the accompanying drawings which, by way of illustration, show preferred embodiments and methods and the principles thereof and what we now consider to be the best mode in which we have contemplated applying those principles. Other methods and embodiments of the invention embodying the same or equivalent principles may be used and structural changes may be made as desired by those skilled in the art without departing from the present invention and the purview of the appended claims.

In the drawings:

Figs. 2 and 3 are enlarged fragmentary side elevational views, which, when placed end to end, illustrate the complete machine;

Fig. 2A is a schematic wiring diagram;

Fig. 4 is a vertical sectional view illustrating the loading portion of the machine;

Fig. 5 is a transverse sectional view of the machine;

Fig. 6 is a fragmentary view of a portion of the cutaway mechanism utilized in severing the work into individual units;

Fig. 6A is a sectional view taken along the line 6A—6A of Fig. 6;

Fig. 7 is a fragmentary view of the cut-off mechanism showing the saw in its elevated position;

Fig. 8 is a view illustrating further details of the cut-off mechanism;

Fig. 9 is a schematic perspective illustrating the manner of assembly of framed panels such as half-screens;

Fig. 10 is a perspective view of a half-screen made in accordance with the present invention;

Figs. 10A and 10B are reduced elevational views showing the half-thickness frame assemblies of another arrangement of frame elements;

Fig. 11 is a fragmentary sectional view taken along the line 11—11 of Fig. 10;

Fig. 12 is a perspective view illustrating a full screen made in accordance with the method of the present invention;

Figs. 13A and 13B are views illustrating the way in which the frame elements of the full screen of Fig. 12 are assembled and related in the machine;

Figure 1:
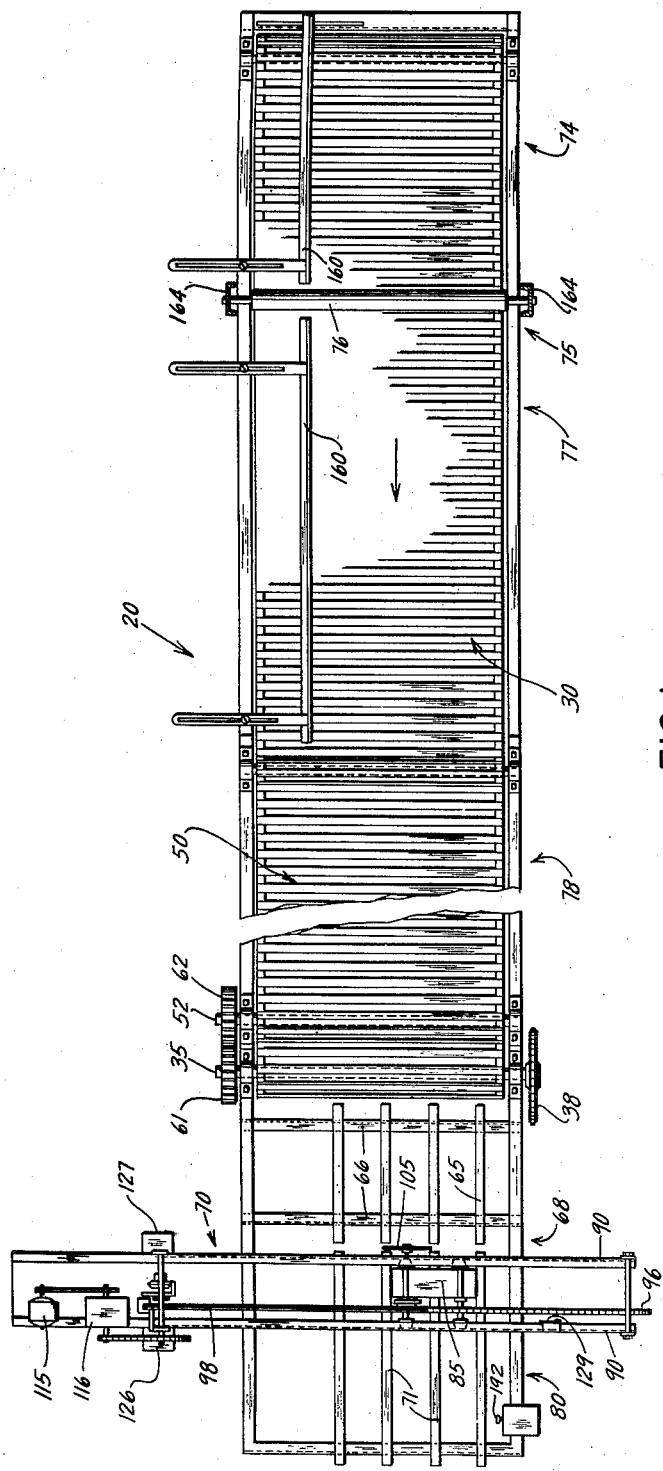
Fig. 1 is a plan view of an assembling machine utilizing the method of the invention and through the use of framed panels may be produced in accordance with the invention.
Figure 14:
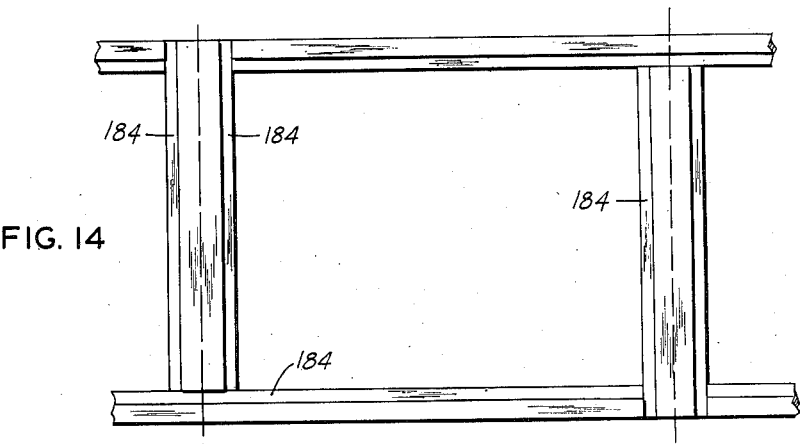
Fig. 14 is a fragmentary plan view illustrating the way in which the lower elements of the frame of a half-storm window sash are assembled in the machine.
Figure 15:
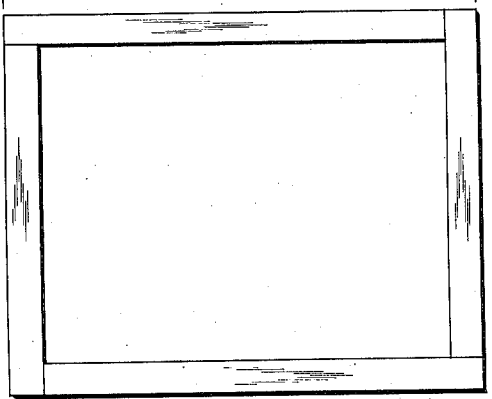
Fig. 15 is a view similar to Fig. 14 and shows the relationship of the upper elements of the frame of such a window.

For purposes of disclosure the present invention has been herein illustrated as it is utilized in making several different types of framed panels and an assembling machine is shown whereby such framed panels and others having similar characteristics may, under the present invention, be assembled quickly and easily and at a minimum cost. In Figs. 1 to 3 of the drawings an assembling machine 20 is illustrated and this assembling machine comprises an elongated frame 21 formed by spaced lower channel beams 22 that are supported at spaced points by legs 23 so as to afford an elongated bed. In this connection it will be noted that transverse angle bars 24 disposed on opposite sides of the legs 23 serve to support the lower beams 22 on the legs 23 and in properly spaced relationship. Similar angle bars 25 connect the lower ends of the legs to impart rigidity to the structure. In the completed machine, the work is moved from right to left as viewed in Figs. 1 to 3 so that the right-hand end of the machine constitutes the loading end while the left-hand end of the machine constitutes the unloading or discharge end of the machine. Spaced a considerable distance from both ends of the bed afforded by the beams 22, a pair of upper channel beams 26 are provided directly over the beams 22 and supported in spaced relation above such beams 22 by cross members in the form of I-beams 27.

The lower beams 22 serve as a support for an endless, chain-type conveyor 30 that is made up of chains 30A and 30B and transverse rigid slats 30S that are connected to the outer faces of the chains 30A and 30B at spaced intervals. Adjacent to the right-hand or loading end of the machine, a transverse shaft 31 is supported by bearing brackets 32 on the upper faces of the beams 22, and spaced sprockets 33 on the shaft 31 serve to support the chains 30A and 30B at the loading end of the machine. Somewhat to the left of the left-hand end of the upper beams 26, a transverse shaft 35 is mounted in bearing brackets 36 disposed on the upper flanges of the beams 22, and sprockets 37 fixed on the shaft 35 for rotation therewith serve to engage and support the other end portions of the chains 30A and 30B.

A sprocket 38 on the lower end of the shaft 35, as viewed in Fig. 1, has a chain 39 extended therefrom to a sprocket 40 that constitutes a power source, this sprocket 40 in the present instance being fixed on a shaft 41 of a speed reducer unit 42.

The upper run of the conveyor 30 is arranged to ride along supporting rails 44 that are in turn carried on the upper flanges of the cross beams 27, as will be evident in Figs. 2, 3 and 4, and thus the upper run of the chain or conveyor 30 affords a flat and substantially continuous surface upon which the elements of the framed panels may be supported and moved from right to left through the machine as viewed in Figs. 2 and 3. The lower run of the conveyor 30 extends, of course, beneath the cross beams 27, and if desired, a supporting shelf 45 may be extended between certain of the legs 23 so as to afford a surface along which the elements of the lower run of the chain may slide.

The upper beams 26 serve as a support for a presser structure 50 which takes substantially the same form as the conveyor 30. Thus the presser structure is in the form of an endless belt arrangement afforded by chains 50A and 50B that are connected by rigid slats 50S at spaced intervals. Shafts 51 and 52 are supported on the beams 26 by bearings 53 and 54, and these shafts have sprockets 55 and 56 thereon which engage the chains 50A and 50B so as to support the endless presser structure 50. The lower run of the presser structure 50 is arranged to move beneath a plurality of guide rails 58 that are suspended beneath transverse angle bars 59 that extend across the upper edges of the beams 26. Thus the movements of the elements of the lower run of the endless presser structure 50 are limited as to their upper displacement, and hence these elements may be effective as a substantially flat downwardly facing presser surface that is disposed in an opposed and accurately determined relation to the left-hand portion, Figs. 2 and 3, of the conveyor 30. Hence the elements of a framed panel may be compressed between the opposed runs of the conveyor 30 and the presser structure 50. The conveyor 30 and the presser structure 50 are driven in unison by meshed gears 61 and 62 that are fixed on the upper ends, Fig. 1, of the shafts 35 and 52 respectively.

When the work has been moved between the opposed runs of the conveyor 30 and the presser structure 50, such work is discharged onto and is moved along a stationary supporting surface afforded by a series of slats 65 that are supported on a pair of transverse channels 66 that are in turn carried on the upper faces of the beams 22. As such work is advanced along the rails 65, such work is moved into a separating station 68 to which a separating or sawing mechanism 70 is mounted as will hereinafter be described. Beyond the separating station 68, the work is moved onto a plurality of supporting rails 71 that are supported on transverse channels 72, and the supporting rails 71 constitute an unloading station from which the finished work pieces are removed after they have passed through the machine.

Thus the machine 20 affords a series of stations from right to left as viewed in Fig. 1, the right hand portion of the conveyor 30 constituting a first loading station 74. A second loading station 75 is then provided, and as herein illustrated this loading station is defined in part by a guide roller 76 that is utilized in guiding flexible panel material such as screen into position in the assembly of the framed panels. Between the loading station 75 and the right hand end of the presser structure 50, a third loading station 77 is provided and at this station the disposal of the various elements of the framed panels is completed. Upon such completion of the preliminary assembling operations, such work moves into a third station of the machine which constitutes a compression zone or station 78 and this compression zone or station is defined by the opposed portions of the conveyor 30 and the presser structure 50. From the compression zone the work passes through the separating station 68 and then to the unloading station 80 that is defined by the supporting rails 71.

As hereinbefore pointed out, this invention contemplates the assembly of framed panels as a continuous series of panels that are joined together by at least certain of the elements that are utilized in forming such framed panels, and the separation of such joined units is effected at the separating station 68 by the saw mechanism 70. The saw mechanism 70 is best shown in Figs. 1, 2, 6, 7 and 8 and it comprises a saw carriage 85 having a pair of transverse shafts 86 thereon which carry guide wheels 87 at opposite ends thereof, and these guide wheels 97 are arranged to ride between the horizontal flanges 89 of a pair of transversely extending channels 90, such channels 90 being supported in upstanding columns 91 and 92 that are afforded at opposite sides of the machine frame. Thus the longitudinal beams 22 as shown in Figs. 1 and 8 have a pair of transverse channels 94 extended thereacross, and the columns 91 and 92 extend upwardly from these channels 94 so as to enable the supporting beam or track 90 to be relatively long.

At the ends of the track 90, a pair of shafts 96 are extended transversely through the tracks 90 in the columns 91 and 92 and these shafts 96 carry aligned sprockets 97 that are embraced by an endless chain 98. The chain 98 in the upper run thereof is arranged to engage a sprocket 99 so that by movement of the chain 98, the sprocket 99 may be rotated. It will be observed in this connection that the carriage 85 is pivotally supported by brackets 85A on the left-hand end portion of the carriage 85, while connecting bars 100 extend between the shafts 86 so that the four wheels 87 bear a predetermined relationship with respect to each other. The other end of the carriage 85 is supported on the right-hand shaft 86 by a link 101 that is pivoted at its lower end on a pivot pin 102 on the carriage 85, while an upper pivot 103 connects the upper end portion of the link 101 to a disc 99D that is in fixed relationship to the sprocket 99. Thus when the sprocket 99 is rotated in a clockwise direction, Fig. 7, it reaches the position that is shown in Fig. 7 wherein a carriage 85 is in a horizontal position and when in this relationship, a clearance slot 101S in the link 101 embraces the right-hand shaft 86. When, however, the sprocket 99 is rotated in a counter-clockwise position, the right-hand end of the carriage 85 is lowered to the position shown in Fig. 8, and when a fully lowered position is reached an upstanding arm or extension 101A in the link engages the shaft 86 to prevent further rotation of the sprocket 99.

Such rotation of the sprocket 99 is attained by operation of the chain 98 which serves not only to raise and lower the carriage 85, but also to move this carriage back and forth across the bed of the machine to effect the desired work-separating operation. In this connection it will be observed that a rotating disc saw 105 is mounted beneath the right-hand end of the carriage 85 and is driven by a belt 106 from a motor 107 that is carried beneath the left-hand end of the carriage. As will be evident in Figs. 7 and 8, the upper run of the chain 98 is urged in a right-hand direction by means of a counterweight 110 having the cable 111 thereof extended upwardly over a pulley 112 carried on the upper end of one of the columns 92. The cable 111 then extends downwardly and around a guide pulley 113 and then extends horizontally to the left and is connected by a lug 114 to the upper run of the chain 98.

When the mechanism is at rest, it is located at the right-hand end of the track 90 as viewed in Fig. 8 and the saw 105 is in its elevated position of Fig. 7. When a separating operation is to be performed, a driving motor 115 is rendered effective to rotate the right hand shaft 96, it being observed that the motor 115 acts through a gear reduction 116 and a chain 117 to constantly drive a sprocket 118 that is fixed on the right-hand shaft 96. Rotation in the shaft may be rendered effective to drive the sprocket 97 by means of a one-revolution clutch mechanism 120 that includes a ratchet wheel 121 connected to the sprocket 97 and a disc 122 connected to the shaft 96. A pawl 123 on the disc 122 normally engages the sprocket 121 and may be disengaged therefrom by a slidable cam 124 mounted on the shaft 96. The cam 124 is arranged so that it may be withdrawn away from the disc 122 by means of a fork 125 and a solenoid 126 that is connected to the fork 125, and a solenoid 127 connected to the fork 125 may be energized to move the cam 124 to a clutch-disengaging position. The solenoid 127 is energized so as to disengage the clutch by closure of a switch 128, this being accomplished by an arm 129 that is engaged by one of the elements of the saw carriage 85 when the carriage 85 reaches its left-hand position, or in other words, after the separation operation has been completed. Upon disengagement of the clutch 120, the counterweight 110 is effective to return the carriage to its rest position at the right-hand end of the supporting track 90, and in this connection it will be noted that the right-hand movement of the upper run of the chain 98 is first effective to rotate the sprocket 99 to its position of Fig. 7 so as to thereby elevate the saw 105 before the right-hand or return movement of the carriage takes place.

As hereinbefore pointed out, the framed panels of the present invention which may be assembled on the machine hereinbefore described may take many different forms and may be adaptable for use in many different arts. A number of different types of frame panels have therefore been disclosed in Figs. 10–18 of the drawings, but it will be understood that these examples are merely for purposes of disclosure and are not intended to constitute an exhaustive showing of all framed panels falling within the scope of the method of the present invention. Thus in Figs. 10 and 11 a framed panel in the form of a half-screen has been illustrated, such half-screen 150 being of the kind that is adapted for use as a screen closure outside of the lower sash of a double-hung window. The half-screen 150 comprises an upper frame member 151, side frame members 152 and 153, and a bottom frame member 154 and these four frame members are arranged to afford a rectangular frame across which a screen panel 155 is stretched. It will be observed that the frame that is thus afforded is in the form of a pair of half-thickness frames between which the border portions of the screen panel 155 are extended and secured, and this manner of forming the frame of the framed panel 150 not only simplifies the planing mill operations that are necessary in preparing the various frame elements for assembly, but also enables the framed panel to be assembled on the machine that has been hereinbefore described. The half-thickness frame structures that are thus utilized may, for purposes of disclosure, be termed front and rear half-thickness frame structures, and the slats which make up such front and rear half-thickness frame structures are herein differentiated through the use of the letters "F" and "R" as suffixes on the reference numerals that have been applied to the various side frame members. Thus the upper side frame member comprises a front frame member 151F and a rear frame member 151R which, as will be evident in Fig. 10, are offset longitudinally in the completed framed panel. Similarly, the other three frame members are afforded by front and rear frame elements that are in each case offset longitudinally so as to enable effective and rigid joints to be formed in a simple manner at the corners of the frame. In the structure shown in Fig. 10, the front and rear frame elements of each frame member are of the same length as will be evident in Fig. 10, and with this arrangement, the elements of each half-thickness frame structure are arranged so as to be symmetrical with respect to a center point of the panel. This symmetry about the center point enables the number of different lengths required in the assembly of a framed panel to be minimized, but where this economy is not necessary, other types of symmetry in the finished frame panel may be attained, as will be hereinafter described with particular reference to Figs. 10a and 10b of the drawings.

Figure 16A:
Fig. 16A is an elevational view of one type of conventional fastening element that may be used.
Figure 16:
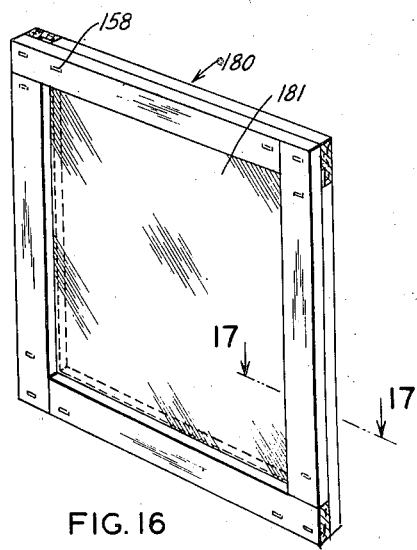
Fig. 16 is a perspective view of the completed half-window type of storm sash.
Figure 17:
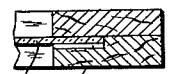
Fig. 17 is a cross sectional view taken along the line 17—17 of Fig. 16.

In assembling the various frame elements of the half-screen 150 of Fig. 10, one end of each frame element is engaged with the side edge of one of the next adjacent frame elements of the same half-thickness frame structure thereby to afford a butt joint. Thus with respect to each half-thickness frame structure, a plurality of similar butt joints 156 are provided in a symmetrical relation about or with respect to a center point in the framed panel. The relationship of the butt joints that are thus afforded is reversed in the other of the two half-thickness frame structures, and the screen panel 150 is disposed between the two-half thickness frame structures as will be evident at 150A in Fig. 11. It will be apparent that with this arrangement, one end of each frame element is disposed in an overlapping face-to-face relationship to the adjacent end of a frame element of the other half-thickness structure, thus in effect forming a lap joint with the frame element of the other half-thickness frame structure that is disposed at right angles thereto. The ultimate effect of this relationship is that a half-lap joint is afforded at each corner of the framed panel 150, and under the present invention the half-lap joints and the opposed faces of all of the frame elements are secured together adhesively so as to afford an extremely rigid structure that may be economically produced. In order that the elements may be maintained in their assembled relationship while pressure is applied initially and is thereafter maintained between the elements of the framed panel, mechanical fastening means are preferably put in place between the various frame elements immediately after assembly thereof has been completed. Such mechanical fastening elements may take the form of nails 158 that are of a commercial kind adapted to be applied through the use of a nailing machine. The details of such a nail 158 have been illustrated in Fig. 16a of the drawings.

The arrangement of elements embodied in the framed panel 150 of Figs. 10 and 11 adapts this framed panel for convenient assembly in the machine that has been heretofore described. Thus the rear frame elements that afford the half-thickness rear frame structure may be put in place on the rear conveyor 30 at the first loading station 74. This may be done while the conveyor 30 is stationary as will hereinafter be described in greater detail, and guide or positioning blocks 159 disposed at one each of the slats 50S of the conveyor. Other guide means such as guide rails 160 may be employed if desired, but in practice it has been determined that this additional guide means is not necessary in most instances. Prior to the positioning of the elements of the half-thickness rear frame structure on the conveyor, one flat face and one end face of each slat has an adhesive suitably applied thereto by any conventional means and in putting the elements into position, the ends to which glue has been applied are disposed so as to form the butt joints 156. The conveyor 30 is then started as will hereinafter be described, and the assembled rear frame structure is advanced to the left in Figs. 1 and 3. When the framed panel is to have a panel material made of screen, such screen is supported in a roll R on a supporting shaft 163 that is supported at its opposite ends in upstanding columns 164. These columns 164 also serve to support the guide roller 76, and the screen 155W is extended as a web downwardly from the roller R and about the guide roller 76 so as to then extend to the left over the conveyor 30. The assembled rear frame structure thus moves into position beneath the web 155 of screen material and this web 155W may be drawn to the left by attaching the same initially to the conveyor 30 so that the screen web 155W will advance with the frame structures as the conveyor 30 advances. It will be clear of course that after the first completely assembled framed panel goes into position beneath the presser structure 50, this relationship will then cause the screen web 155W to advance. The roll R is attached to the shaft 163, and a conventional brake structure 170 is mounted on one of the columns 164 so as to apply braking pressure to the shaft 163. This serves to maintain the web 155 under tension 155W so as to thereby assure proper stretching of the panel material in the frames as they are assembled.

After the assembled rear frame structure has moved into position beneath the screen web 155W and opposite the third loading station 77, the front frame elements are put in position on top of the screen panel and in the opposing relationship to the rear frame elements as indicated in Fig. 10. The fastening nails 158 are then applied so as to hold the assembled elements in position, it being noted that the lower face and one end edge of each front frame element has an adhesive applied thereto prior to the position on the machine so that when such positioning has been completed, the required adhesive is in position and the frame elements may be pressed together during curing of the adhesive.

As the advance movements of the conveyor 30 progress, the presser structure 50 becomes impressive upon each framed panel in succession and this presser structure may be of such a length that, considering the nature of the adhesive, an adequate curing or hardening of the adhesive may be obtained within the machine or in other words within the compressure structure 78 that is defined by the presser structure 50. In practice, however, it has been determined that only a preliminary curing is necessary within the compressure zone 78, and the framed panels may then be removed from the machine at the discharge end thereof and may be placed in stacks under the required compression so as to cure for the required length of time.

It will be evident that the framed panels 150 may be assembled individually on the machine and that under such circumstances the only separating operation required at the separating station 68 is the severing of the screen web 155W between the adjacent individual units. Under other circumstances, however, the individual units may be assembled so as to afford a continuous succession of interconnected units 150, and under such circumstances the integral frame elements of adjacent units may be separated at the separating station 68. Thus, as illustrated in Fig. 9 of the drawings, the top and bottom members 151 and 154 (of Fig. 10) of each frame structure may be formed by relatively wide members 170W so that the units are joined together as they are put in place in the machine. Such a continuous series of panels may be then cut apart to form individual units or half-screens such as the unit 150 of Fig. 10, or may be cut at points 171 and 172 as indicated in Fig. 9 to afford full length screens such as the screen shown in Figs. 12, 13A and 13B of the drawings as full length screens 175. Where full length screens are being formed, the elements such as the elements 176 of Fig. 9 may be afforded by a single continuous strip of line, and such an element is illustrated in Figs. 12, 13A and 13B.

In Figs. 12, 13A and 13B, the long side frame elements that are thus utilized when full length screens 175 are to be produced have been identified as 176L, and in Figs. 13A and 13B, the front and rear half-thickness frame structures have been shown. In such an arrangement of frame elements, the several corners, including those corners on joints at the central cross rail 177 are in the nature of half-lap joints and the elements are assembled in the machine in the manner hereinbefore described so as to adhesively and mechanically secure the frame elements together. In the production of full length screens 175, it is often desirable to locate the severance lines at 171 and 172 so as to afford a relatively high lower frame element 178 and a comparatively narrow upper frame element 179, as will be evident in Figs. 13B of the drawings. Otherwise, the method of procedure or assembly is the same as hereinbefore described.

The framed panels (of the present invention) may also be of such a character that the panel material is rigid in character, and in Figs. 14–17, such an arrangement has been illustrated as applied to a half-length storm sash 180. This storm sash has a rigid glass panel 181, and the assembly of the elements is substantially the same as hereinbefore described with the exception, however, that the rear frame elements have rabbeted grooves 184 formed therein into which the bordering edges of the glass panel extend. The parts are secured together in the same manner through the use of adhesive that is similarly applied, and mechanical fastening elements 158 are similarly applied. Such framed panels 180 embodying rigid panel material may, of course, be assembled individually as hereinbefore described, or may be assembled as a group or series of units that are separated at the separating station 68 by means of the saw structure 70.

Figure 18:
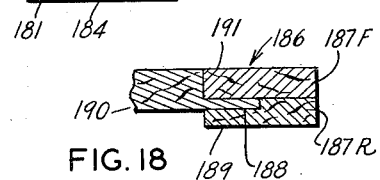
Fig. 18 is a similar view showing another kind of framed panel.

It has also been pointed out that framed panels made by the method of the present invention may be utilized as table tops and in Fig. 18 a fragmentary illustration of such a table top structure will be found. In this framed panel 186, a rear frame element 187R has a rabbeted groove 188 into which a narrow flange 189 of a rabbeted table top panel 190 extends. The flange 189 is formed by rabbeting the table top panel 190 to afford an edge 191, and the front frame element 187F fits against the shoulder 191 and against the rear frame element 187R so as to be adhesively secured to the surface or edge 191, the flange 189 and the rear frame element 187R. This form of frame panel may, of course, be formed in the same manner as hereinbefore described with respect to the other types of framed panels.

When the framed panels are being assembled in a continuous series, the advancing movement of the conveyor is automatically stopped each time the forward end of the leading assembled unit strikes a sensing lever 192, Fig. 2A, that is mounted on one of the rails 71. This sensing lever 192 serves to momentarily close a switch 193 which acts to stop the drive of the conveyor 30.

Thus, as shown in Fig. 2A, the lever 192 acts on a toothed star wheel 194 through a conventional pawl 195 to step the wheel 194 through one tooth space, and this causes a cam lever 196 to momentarily close the switch 192. Such closure of the switch 193 serves to energize a control relay 198 which has normally closed contacts 199—1 and normally open contacts 198—2. A three phase power source having lines L1, L2 and L3 is arranged to be connected to the conveyor drive motor by a contactor 200 having normally open power contacts 200P and normally open holding contacts 200H, all of such contacts being adapted to be moved to closed positions by an operating coil 200C.

Operating current for the relay 198, the coil 200C and the relays 126 and 127 is taken from the lines L2 and L3. Thus a wire 201 extends from wire L3 to one end of the coil 200C, while a wire 202 extends from the other end of the coil 200C to one contact of a push button switch 203 that is located near the loading station 77. Wires 204 and 205 in series extend from the other contact of the switch 203 to the wire L2, so that closure of the switch 203 energizes the coil 200C and closes all of the contacts of the contactor 200. A holding circuit for the contactor 200 includes the contacts 200H and 198—1, and for this purpose a wire 206 extends from one contact 200H to the wire 205 so as to thereby be connected to wire L2, while a wire 207 extends from the other contact 200H to one contact 198—1. A wire 208 extends the holding circuit from the other contact 198—1 to the wire 202, to thereby complete such holding circuit. Thus after closure of the push button switch 203, the conveyor 30 continues to operate until the relay 198 is energized, and this, of course, opens the contacts 198—1 so as to release the contactor 200.

The circuit for the relay 198 is afforded by wires 210, 211 and 212 extended in series from the wire L2 to one terminal of the relay 198, a wire 213 being extended from the other terminal of the relay 198 to one contact of the switch 193. Wires 214, 215 and 216 extend in series from the other contact of the switch 193 to the wire L3 so that closure of the switch 193 serves to energize the relay 198.

When the relay 198 is thus energized, the closure of contacts 198—2 thereof serves to energize the solenoid 126 so as to start the operation of the cut-off saw. Thus a wire 217 extends from the wire 210 to one terminal of the solenoid 126, while a wire 218 extends from the wire 216 to one contact 198—2, and the other contact 198—2 is connected by a wire 219 to the other terminal of the solenoid 126 to thereby complete the energizing circuit for the solenoid 126.

The solenoid 127 is, of course, used to open the saw driving clutch, and this is governed by the switch 128. Thus a wire 220 extends from one terminal of the solenoid 127 to the wire 215, while a wire 221 extends from the wire 211 to one contact of the switch 128, and a wire 222 from the other contact of the switch 128 to the other terminal of the solenoid 127 completes the energizing circuit for this solenoid.

Summarizing the operation and control, it will be evident that the conveyor may be started by closing the push button switch 203, and the conveyor continues to operate because of the holding circuit for the control contactor 200. The advancing of the work causes the leading panel to strike the sensing lever 192, thereby to momentarily close the switch 193. This energizes the relay 198 momentarily so as to break the holding circuit for the motor control contactor 200, thereby to stop the conveyor 30. The relay 198 also causes the solenoid 126 to be energized, thereby to initiate the cycle of the cut-off saw, and when this cycle has been completed, the sensing switch 193 is closed so as to energize the clutch-opening solenoid 127. The saw is thus freed for return to its initial position under the influence of its counter-weight, and the machine is then ready for starting of another conveyor advancing cycle.

From the foregoing description it is to be evidenced that the present invention enables framed panels of many different types to be readily and easily assembled, and this is accomplished under the present invention in such a way that skilled forming and fitting operations are eliminated. It will also be evident that the present invention materially simplifies the problem of obtaining the proper stretched relationship in the panel material of certain types of framed panels. It will also be clear that the present invention permits framed panels to be made as a continuous series which may thereafter be severed to form individual panel units. It will also be evident that the present invention enables the finish molding heretofore required in screen panels to be eliminated, thereby to save in material, assembly labor and painting with the resultant saving in cost of such screens; and this invention also enables the formation and finishing of the wood elements to be simplified by enabling frame elements finished or smoothly surfaced, by planing upon but two faces to be employed. Furthermore, the present invention effects a marked reduction in the size or cross section of the lumber used in such frames and this results in economy, both as to savings in lumber, and by enabling lumber to be used which would otherwise be considered as scrap. These results are accomplished while at the same time enabling high strength screens, or other framed panels, to be readily and economically produced. Under the present invention, by forming each frame member from two half-thickness frame elements, the use of thin strips such as barking strips, edgings, off falls and other material that would otherwise be considered as scrap, is facilitated, and by such a construction, the objectionable effect of weaknesses that are often found in a particular frame element is minimized; and at least a substantial proportion of elements may be made from shorter pieces than heretofore were required, thereby to further promote the use of cheap scrap material.

As a further advantageous feature of the present invention, it is to be noted that under the present invention the relatively flexible or low strength panel material cooperates efficiently with the frame elements to attain exceptionally high strength and extreme ruggedness and rigidity in the finished panels; and moreover, through the greatly improved strength characteristics as aforesaid, a reduction in size and cost of the frame elements may be effected where the maximum of economy is desired.

This application is a division of the parent application, Serial No. 753,586, filed June 9, 1947.

Thus, while we have illustrated and described the method of the present invention in relation to preferred embodiments of panels, it is to be understood that these are capable of variation and modification and we therefore do not wish to be limited to the precise details set forth, but desire to avail ourselves of such changes and alterations as fall within the purview of the following claims.

We claim:

1. The method of producing a framed panel which consists in disposing a first set of rectangular half-thickness side frame elements in the plan-form desired in the frame, disposing panel material across the partial frame thus formed and in an overlapping relation to at least a portion of the upper surfaces of said frame elements, disposing a second set of rectangular half-thickness side frame elements over said first set in an endwise displaced relation to afford lapped corner joints, and adhesively securing the opposed surfaces of said sets together and to the interposed border portions of said panel material.

2. The method of producing a framed panel which consists in disposing a first set of rectangular half-thickness side frame elements in the plan-form desired in the frame and with one end of each element butt jointed against the side edge of the adjacent element to thereby afford symmetrically disposed butt joints at the respective corners, disposing panel material across the partial frame thus formed and in an overlapping relation to at least a portion of the upper surfaces of said frame elements, disposing a second set of rectangular half-thickness side frame elements over said first set in an endwise displaced relation to afford similar but reversely related butt joints between the elements of said second set, and adhesively securing the opposed surfaces of said sets together and to the interposed border portions of said panel material to afford a rigid framed panel having half-lapped corner joints.

3. The method of producing a framed panel which consists in disposing a first set of rectangular half-thickness side frame elements in the plan-form desired in the frame and with one end of an element butt jointed against the side edge of the adjacent element at each corner to thereby afford butt joints at the respective corners, disposing panel material across the partial frame thus formed and in an overlapping relation to at least a portion of the upper surfaces of said frame elements, disposing a second set of rectangular half-thickness side frame elements over said first set in an endwise displaced relation to afford similar but reversely related butt joints between the elements of said second set, and securing the opposed surfaces of said sets together and to the interposed border portions of said panel material to afford a rigid framed panel having half-lapped corner joints.

4. The method of producing a framed panel which consists in applying adhesive to one flat face and one end edge of each of a first set of rectangular half-thickness side frame elements and disposing said elements in the plan-form desired in the frame with the adhesive coated flat faces facing upwardly and with said one end edge of each element butt jointed against the side edge of the adjacent element to thereby afford symmetrically disposed butt joints at the respective corners, disposing panel material across the partial frame thus formed and in an overlapping relation to at least a portion of the upper surfaces of said frame elements, applying adhesive to one flat face and one end edge of each of a second set of rectangular half-thickness side frame elements and disposing the elements of said second set with the adhesive coated flat faces facing downwardly over said first set in an endwise and in displaced relation to afford similar but reversely related butt joints between the elements of said second set, mechanically securing the lapped corner surfaces and butt jointed surfaces of said sets together, and pressing said sets together against the interposed border portions of said panel material while curing the adhesive to thereby afford a rigid framed panel having half-lapped corner joints.

5. The method of producing a framed panel which consists in applying adhesive to one flat face and one end edge of each of a first set of rectangular half-thickness side frame elements and disposing said elements in the plan-form desired in the frame with the adhesive coated flat faces facing upwardly and with said one end edge of each element butt jointed against the side edge of the adjacent element to thereby afford symmetrically disposed butt joints at the respective corners, disposing panel material across the partial frame thus formed and in an overlapping relation to at least a portion of the upper surfaces of said frame elements, applying adhesive to one flat face and one end edge of each of a second set of rectangular half-thickness side frame elements and disposing the elements of said second set with the adhesive coated flat faces facing downwardly over said first set in an endwise and in displaced relation to afford similar but reversely related butt joints between the elements of said second set, applying at least three fastening elements at each corner of the frame to secure the opposed corner and butt jointed surfaces of said sets together, and pressing said sets together against the interposed border portions of said panel material while curing the adhesive to thereby afford a rigid framed panel having half-lapped corner joints.

6. The method of producing a framed panel which consists in applying adhesive to one flat face of each of a first set of rectangular half-thickness side frame elements and disposing said elements in the plan-form desired in the frame with the adhesive coated flat faces facing upwardly and with one end edge of each element butt jointed against the side edge of the adjacent element to thereby afford symmetrically disposed butt joints at the respective corners, disposing panel material across the partial frame thus formed and in an overlapping relation to at least a portion of the upper surfaces of said frame elements, applying adhesive to one flat face of each of a second set of rectangular half-thickness side frame elements and disposing the elements of said second set with the adhesive coated flat faces facing downwardly over said first set in an endwise and in displaced relation to afford similar but reversely related butt joints between the elements of said second set, mechanically securing the opposed elements of said sets together adjacent the corners of the frame, and pressing said sets together against the interposed border portions of said panel material while curing the adhesive to thereby afford a rigid framed panel having half-lapped corner joints.

7. The method of producing a framed panel which consists in applying adhesive to one flat face and one end edge of each of a first set of rectangular half-thickness side frame elements and disposing said elements in the plan-form desired in the frame with the adhesive coated flat faces facing upwardly and with said one end edge of each element butt jointed against the side edge of the adjacent element to thereby afford symmetrically disposed butt joints at the respective corners, disposing panel material across the partial frame thus formed and in an overlapping relation to at least a portion of the upper surfaces of said frame elements, applying adhesive to one flat face and one end edge of each of a second set of rectangular half-thickness side frame elements and disposing the elements of said second set with the adhesive coated flat faces facing downwardly over said first set in an endwise and in displaced relation to afford similar but reversely related butt joints between the elements of said second set, and pressing said sets together against the interposed border portions of said panel material while curing the adhesive to thereby afford a rigid framed panel having half-lapped corner joints.

8. The method of producing a series of framed panels which consists in disposing a first layer of rectangular half-thickness side frame elements to afford a series of frames in the plan-form desired and having wide frame elements forming integral frame elements for at least certain of the adjacent frames, and with one end of each element butt jointed against the side edge of the adjacent element to thereby afford butt joints at the respective corners, disposing panel material across the partial frames thus formed and in an overlapping relation to at least a portion of the upper surfaces of said frame elements, disposing a second layer of rectangular half-thickness side frame elements over said first layer in an endwise displaced relation to afford similar but reversely related butt joints between the elements of said second set, and securing the opposed surfaces of said sets together and to the interposed border portions of said panel material to afford a rigid framed panel having half-lapped corner joints.

9. The method of producing a series of framed panels which consists in disposing a first layer of rectangular half-thickness side frame elements to afford a series of frames in the plan-form desired and having wide frame elements forming integral frame elements for at least certain of the adjacent frames, and with one end of each element butt jointed against the side edge of the adjacent element to thereby afford butt joints at the respective corners, disposing panel material across the partial frames thus formed and in an overlapping relation to at least a portion of the upper surfaces of said frame elements, disposing a second layer of rectangular half-thickness side frame elements over said first layer in an endwise displaced relation to afford similar but reversely related butt joints between the elements of said second set, securing the opposed surfaces of said sets together and to the interposed portions of said panel material to afford a rigid framed panel having half-lapped corner joints, and separating said wide frame elements longitudinally thereof to form framed panels of the desired form and size.

10. The method of producing a series of framed panels which consists in disposing a first layer of rectangular half-thickness side frame elements to afford a series of frames in the plan-form desired and having wide frame elements forming integral frame elements for at least certain of the adjacent frames, and with one end of each element butt jointed against the side edge of the adjacent element to thereby afford butt joints at the respective corners, disposing a continuous sheet panel material across the successive partial frames thus formed and in an overlapping relation to at least a portion of the upper surfaces of said frame elements, disposing a second layer of rectangular half-thickness side frame elements over said first layer in an endwise displaced relation to afford similar but reversely related butt joints between the elements of said second set, securing the opposed surfaces of said sets together and to the interposed border portions of said panel material to afford a rigid framed panel having half-lapped corner joints, and separating said wide frame elements longitudinally thereof to form framed panels of the desired form and size.

11. The method of producing a series of framed panels which consists in disposing a first layer of rectangular half-thickness side frame elements to afford a series of frames in the plan-form desired and having wide frame elements forming integral frame elements for at least certain of the adjacent frames, and with one end of each element butt jointed against the side edge of the adjacent element to thereby afford butt joints at the respective corners, disposing panel material across the partial frames thus formed and in an overlapping relation to at least a portion of the upper surfaces of said frame elements, disposing a second layer of rectangular half-thickness side frame elements over said first layer in an endwise displaced relation to afford similar but reversely related butt joints between the elements of said second set, securing the opposed surfaces of said sets mechanically and adhesively together and to the interposed border portions of said panel material to afford a rigid framed panel having half-lapped corner joints, and separating said wide frame elements longitudinally thereof to form framed panels of the desired form and size.

CARL J. DELEGARD.
MICHAEL J. NARDULLI.

REFERENCES CITED

The following references are of record in the file of this patent:

UNITED STATES PATENTS

| Number | Name | Date |
|---|---|---|
| 515,814 | Braun | Mar. 6, 1894 |
| 1,116,632 | Schleicher | Nov. 10, 1914 |
| 1,824,187 | Adams | Sept. 22, 1931 |